US010559324B2

(12) United States Patent
Sievert et al.

(10) Patent No.: US 10,559,324 B2
(45) Date of Patent: *Feb. 11, 2020

(54) MEDIA IDENTIFIER GENERATION FOR CAMERA-CAPTURED MEDIA

(71) Applicant: GoPro, Inc., San Mateo, CA (US)

(72) Inventors: Otto K. Sievert, Oceanside, CA (US); Gurprit Cheema, Carlsbad, CA (US); David A. Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,304

(22) Filed: Oct. 5, 2018

(65) Prior Publication Data

US 2019/0043534 A1 Feb. 7, 2019

Related U.S. Application Data

(63) Continuation of application No. 15/600,322, filed on May 19, 2017, now Pat. No. 10,096,341, which is a
(Continued)

(51) Int. Cl.
*H04N 9/80* (2006.01)
*G11B 27/036* (2006.01)
(Continued)

(52) U.S. Cl.
CPC .......... *G11B 27/036* (2013.01); *G11B 27/102* (2013.01); *G11B 27/3027* (2013.01);
(Continued)

(58) Field of Classification Search
CPC . G11B 27/036; G11B 27/102; G11B 27/3027; G11B 27/3081
(Continued)

(56) References Cited

U.S. PATENT DOCUMENTS 5,130,794 A 7/1992 Ritchey
6,337,683 B1 1/2002 Gilbert
(Continued)

FOREIGN PATENT DOCUMENTS

FR 2933226 A1 1/2010
JP H09181966 A 7/1997
(Continued)

OTHER PUBLICATIONS

PCT International Search Report and Written Opinion for PCT/US16/31076, dated Aug. 8, 2016, 19 Pages.
(Continued)

*Primary Examiner* — Robert Chevalier
(74) *Attorney, Agent, or Firm* — Esplin & Associates, PC

(57) ABSTRACT

A video identifier uniquely identifying a video captured by a camera is generated. The video includes video frames and optionally concurrently captured audio as well as video metadata describing the video. Video data is extracted from at least two of the video's frames. By combining the extracted video data in an order specified by an identifier generation protocol, an extracted data object is generated. The extracted data object is hashed to generate the unique media identifier, which is stored in association with the video. The identifier generation protocol may indicate the portions of the video data to extract, such as video data corresponding to particular video frames and audio data corresponding to particular audio samples. The extracted data object may include a size of particular video frames, a number of audio samples in the video, or the duration of the video, for example.

20 Claims, 9 Drawing Sheets

Related U.S. Application Data continuation of application No. 14/883,943, filed on Oct. 15, 2015, now Pat. No. 9,734,870.

(60) Provisional application No. 62/099,985, filed on Jan. 5, 2015.

(51) Int. Cl.
   *G11B 27/10* (2006.01)
   *G11B 27/30* (2006.01)
   *G06K 9/00* (2006.01)

(52) U.S. Cl.
   CPC ...... *G11B 27/3081* (2013.01); *G06K 9/00718* (2013.01); *G06K 9/00744* (2013.01)

(58) Field of Classification Search
   USPC ............... 386/224, 223, 239, 248, 353, 290
   See application file for complete search history.

(56) References Cited

U.S. PATENT DOCUMENTS

| | | |
|---|---|---|
| 6,593,956 B1 | 7/2003 | Potts |
| 6,633,685 B1 | 10/2003 | Kusama |
| 7,016,540 B1 | 3/2006 | Gong |
| 7,194,636 B2 | 3/2007 | Harrison |
| 7,222,356 B1 | 5/2007 | Yonezawa |
| 7,266,771 B1 | 9/2007 | Tow |
| 7,483,618 B1 | 1/2009 | Edwards |
| 7,512,886 B1 | 3/2009 | Herberger |
| 7,681,223 B2 | 3/2010 | Takahashi |
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |
| 8,612,463 B2 | 12/2013 | Brdiczka |
| 8,706,675 B1 | 4/2014 | Samaniego |
| 8,718,447 B2 | 5/2014 | Yang |
| 8,730,299 B1 | 5/2014 | Kozko |
| 8,763,023 B1 | 6/2014 | Goetz |
| 8,768,142 B1 | 7/2014 | Ju |
| 8,774,560 B2 | 7/2014 | Sugaya |
| 8,910,046 B2 | 12/2014 | Matsuda |
| 8,971,623 B2 | 3/2015 | Gatt |
| 8,988,509 B1 | 3/2015 | Macmillan |
| 9,032,299 B2 | 5/2015 | Lyons |
| 9,036,001 B2 | 5/2015 | Chuang |
| 9,041,727 B2 | 5/2015 | Ubillos |
| 9,077,956 B1 | 7/2015 | Morgan |
| 9,087,297 B1 | 7/2015 | Filippova |
| 9,111,579 B2 | 8/2015 | Meaney |
| 9,142,253 B2 | 9/2015 | Ubillos |
| 9,142,257 B2 | 9/2015 | Woodman |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,342,376 B2 | 5/2016 | Jain |
| 9,396,385 B2 | 7/2016 | Bentley |
| 9,418,283 B1 | 8/2016 | Natarajan |
| 9,423,944 B2 | 8/2016 | Eppolito |
| 9,436,875 B2 | 9/2016 | Curcio |
| 9,473,758 B1 | 10/2016 | Long |
| 9,479,697 B2 | 10/2016 | Aguilar |
| 9,564,173 B2 | 2/2017 | Swenson |
| 9,779,775 B2 | 10/2017 | Pacurariu |
| 2002/0165721 A1 | 11/2002 | Chang |
| 2003/0048843 A1 | 3/2003 | Hashimoto |
| 2004/0001706 A1 | 1/2004 | Jung |
| 2004/0076404 A1* | 4/2004 | Nakano ............ G11B 20/00086 386/200 |
| 2004/0128317 A1 | 7/2004 | Sull |
| 2005/0025454 A1 | 2/2005 | Nakamura |
| 2005/0060365 A1 | 3/2005 | Robinson |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2006/0122842 A1 | 6/2006 | Herberger |
| 2006/0156219 A1 | 7/2006 | Haot |
| 2007/0002946 A1 | 1/2007 | Bouton |
| 2007/0088833 A1 | 4/2007 | Yang |
| 2007/0106419 A1 | 5/2007 | Rachamadugu |
| 2007/0168543 A1 | 7/2007 | Krikorian |
| 2007/0173296 A1 | 7/2007 | Hara |
| 2007/0182861 A1 | 8/2007 | Luo |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0208791 A1 | 8/2008 | Das |
| 2008/0253735 A1 | 10/2008 | Kuspa |
| 2008/0313541 A1 | 12/2008 | Shafton |
| 2009/0019995 A1 | 1/2009 | Miyajima |
| 2009/0027499 A1 | 1/2009 | Nicholl |
| 2009/0060342 A1 | 3/2009 | Chiang |
| 2009/0125559 A1 | 5/2009 | Yoshino |
| 2009/0213270 A1 | 8/2009 | Ismert |
| 2009/0252474 A1 | 10/2009 | Nashida |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0046842 A1 | 2/2010 | Conwell |
| 2010/0064219 A1 | 3/2010 | Gabrisko |
| 2010/0086216 A1 | 4/2010 | Lee |
| 2010/0104261 A1 | 4/2010 | Liu |
| 2010/0161720 A1 | 6/2010 | Colligan |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0287476 A1 | 11/2010 | Sakai |
| 2010/0299630 A1 | 11/2010 | Mccutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093605 A1 | 4/2011 | Choudhury |
| 2011/0093798 A1 | 4/2011 | Shahraray |
| 2011/0103700 A1 | 5/2011 | Haseyama |
| 2011/0134240 A1 | 6/2011 | Anderson |
| 2011/0137156 A1 | 6/2011 | Razzaque |
| 2011/0170086 A1 | 7/2011 | Oouchida |
| 2011/0173565 A1 | 7/2011 | Ofek |
| 2011/0206351 A1 | 8/2011 | Givoly |
| 2011/0211040 A1 | 9/2011 | Lindemann |
| 2011/0242098 A1 | 10/2011 | Tamaru |
| 2011/0258049 A1 | 10/2011 | Ramer |
| 2011/0293250 A1 | 12/2011 | Deever |
| 2011/0317981 A1 | 12/2011 | Fay |
| 2011/0320322 A1 | 12/2011 | Roslak |
| 2012/0014673 A1 | 1/2012 | O'Dwyer |
| 2012/0020656 A1 | 1/2012 | Farmer |
| 2012/0027381 A1 | 2/2012 | Kataoka |
| 2012/0030029 A1 | 2/2012 | Flinn |
| 2012/0030263 A1 | 2/2012 | John |
| 2012/0057775 A1 | 3/2012 | Suzuki |
| 2012/0057852 A1 | 3/2012 | Devleeschouwer |

(56) References Cited

U.S. PATENT DOCUMENTS

| | | |
|---|---|---|
| 2012/0083705 A1 | 4/2012 | Yuen |
| 2012/0114233 A1 | 5/2012 | Gunatilake |
| 2012/0123780 A1 | 5/2012 | Gao |
| 2012/0127169 A1 | 5/2012 | Barcay |
| 2012/0131591 A1 | 5/2012 | Moorthi |
| 2012/0134651 A1 | 5/2012 | Cottrell |
| 2012/0141019 A1 | 6/2012 | Zhang |
| 2012/0192225 A1 | 7/2012 | Harwell |
| 2012/0198319 A1 | 8/2012 | Agnoli |
| 2012/0206565 A1 | 8/2012 | Villmer |
| 2012/0209889 A1 | 8/2012 | Agnoli |
| 2012/0210205 A1 | 8/2012 | Sherwood |
| 2012/0210228 A1 | 8/2012 | Wang |
| 2012/0219271 A1 | 8/2012 | Vunic |
| 2012/0246114 A1 | 9/2012 | Edmiston |
| 2012/0283574 A1 | 11/2012 | Park |
| 2012/0311448 A1 | 12/2012 | Achour |
| 2013/0024805 A1 | 1/2013 | In |
| 2013/0041948 A1 | 2/2013 | Tseng |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0104177 A1 | 4/2013 | Kwan |
| 2013/0114902 A1 | 5/2013 | Sukthankar |
| 2013/0127636 A1 | 5/2013 | Aryanpur |
| 2013/0136193 A1 | 5/2013 | Hwang |
| 2013/0142384 A1 | 6/2013 | Ofek |
| 2013/0151970 A1 | 6/2013 | Achour |
| 2013/0166303 A1 | 6/2013 | Chang |
| 2013/0182166 A1 | 7/2013 | Shimokawa |
| 2013/0185388 A1 | 7/2013 | Mackie |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0222583 A1 | 8/2013 | Earnshaw |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0263002 A1 | 10/2013 | Park |
| 2013/0271602 A1 | 10/2013 | Bentley |
| 2013/0282747 A1 | 10/2013 | Cheng |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0330019 A1 | 12/2013 | Kim |
| 2013/0343727 A1 | 12/2013 | Rav-Acha |
| 2014/0026156 A1 | 1/2014 | Deephanphongs |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0153900 A1 | 6/2014 | Tanaka |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0193040 A1 | 7/2014 | Bronshtein |
| 2014/0212107 A1 | 7/2014 | Saint-Jean |
| 2014/0219634 A1 | 8/2014 | Mcintosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341527 A1 | 11/2014 | Hurley |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0058709 A1 | 2/2015 | Zaletel |
| 2015/0067811 A1 | 3/2015 | Agnew |
| 2015/0071547 A1 | 3/2015 | Keating |
| 2015/0085111 A1 | 3/2015 | Lavery |
| 2015/0113009 A1 | 4/2015 | Zhou |
| 2015/0154452 A1 | 6/2015 | Bentley |
| 2015/0156247 A1 | 6/2015 | Hensel |
| 2015/0178915 A1 | 6/2015 | Chatterjee |
| 2015/0186073 A1 | 7/2015 | Pacurariu |
| 2015/0220504 A1 | 8/2015 | Bocanegra Alvarez et al. |
| 2015/0254871 A1 | 9/2015 | Macmillan |
| 2015/0256689 A1 | 9/2015 | Erkkila |
| 2015/0256746 A1 | 9/2015 | Macmillan |
| 2015/0256808 A1 | 9/2015 | Macmillan |
| 2015/0262616 A1 | 9/2015 | Jaime |
| 2015/0271483 A1 | 9/2015 | Sun |
| 2015/0281710 A1 | 10/2015 | Sievert |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0373281 A1 | 12/2015 | White |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0094601 A1 | 3/2016 | Besehanic |
| 2016/0098941 A1 | 4/2016 | Kerluke |
| 2016/0103830 A1 | 4/2016 | Cheong |
| 2016/0119551 A1 | 4/2016 | Brown |
| 2016/0133295 A1 | 5/2016 | Boyle |
| 2016/0189752 A1 | 6/2016 | Galant |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |
| 2016/0292881 A1 | 10/2016 | Bose |
| 2016/0300594 A1 | 10/2016 | Allen |
| 2016/0358603 A1 | 12/2016 | Azam |
| 2016/0366330 A1 | 12/2016 | Boliek |
| 2017/0006214 A1 | 1/2017 | Andreassen |

FOREIGN PATENT DOCUMENTS

| | | |
|---|---|---|
| JP | 2005252459 A | 9/2005 |
| JP | 2006053694 A | 2/2006 |
| JP | 2008059121 A | 3/2008 |
| JP | 2009053748 A | 3/2009 |
| JP | 2011188004 A | 9/2011 |
| WO | 2001020466 | 3/2001 |
| WO | 2006001361 A1 | 1/2006 |
| WO | 2009040538 A1 | 4/2009 |
| WO | 2012057623 A1 | 5/2012 |
| WO | 2012086120 A1 | 6/2012 |

OTHER PUBLICATIONS

Ernoult, Emeric, 'How to Triple Your YouTube Video Views with Facebook', SocialMediaExaminer.com, Nov. 26, 2012, 16 pages.

(56) References Cited

OTHER PUBLICATIONS

Han et al., Deep Compression: Compressing Deep Neural Networks with Pruning, Trained Quantization and Huffman Coding, International Conference on Learning Representations 2016, 14 pgs.
He et al., 'Deep Residual Learning for Image Recognition,' arXiv:1512.03385, 2015, 12 pgs.
Iandola et al., 'SqueezeNet: AlexNet-level accuracy with 50x fewer parameters and <0.5MB model size', arXiv:1602.07360v3 [cs.CV] Apr. 6, 2016 (9 pgs.).
Ioffe et al., 'Batch Normalization: Accelerating Deep Network Training by Reducing Internal Covariate Shift,' arXiv:1502.03167, 2015, 11 pgs.
Parkhi et al., 'Deep Face Recognition,' Proceedings of the British Machine Vision, 2015, 12 pgs.
PCT International Search Reort for PCT/US15/18538 dated Jun. 16, 2015 (2 pages).
PCT International Search Report and Written Opinion for PCT/US15/12086 dated Mar. 17, 2016, 7 pages.
PCT International Search Report for PCT/US15/23680 dated Aug. 3, 2015, 4 pages.
PCT International Search Report for PCT/US15/41624 dated Nov. 4, 2015, 5 pages.
PCT International Search Report for PCT/US17/16367 dated Apr. 14, 2017 (2 pages).
Ricker, 'First Click: TomTom's Bandit camera beats GoPro with software' Mar. 9, 2016 URL: http://www.theverge.com/2016/3/9/11179298/tomtom-bandit-beats-gopro (6 pages).
Schroff et al., 'FaceNet: A Unified Embedding for Face Recognition and Clustering,' IEEE Conference on Computer Vision and Pattern Recognition (CVPR), 2016, 10 pgs.
Tran et al., 'Learning Spatiotemporal Features with 3D Convolutional Networks', arXiv:1412.0767 [cs.CV] Dec. 2, 2014 (9 pgs).
Yang et al., 'Unsupervised Extraction of Video Highlights via Robust Recurrent Auto-encoders' arXiv:1510.01442v1 [cs.CV] Oct. 6, 2015 (9 pgs).
PCT International Search Report and Written Opinion for PCT/US15/18538, dated Jun. 16, 2015, 26 pages.
PCT International Written Opinion for PCT/US2015/041624, dated Dec. 17, 2015, 7 Pages.
Supplemental European Search Report for 15773596.0 dated Aug. 4, 2017, 15 pages.
PSonar URL: http://www.psonar.com/about retrieved on Aug. 24, 2016, 3 pages.
PCT International Preliminary Report on Patentability for PCT/US2015/023680, dated Oct. 4, 2016, 10 pages.
Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
Office Action for U.S. Appl. No. 13/831,124, dated Mar. 19, 2015, 14 pages.
Japanese Office Action for JP Application No. 2013-140131, dated Aug. 5, 2014, 6 pages.
Supplemental European Search Report for 15773596.0 dated Nov. 8, 2017, 12 pages.
Kiyoharu Aizawa et al., Efficient retrieval of life log based on context and content, Proceedings of the 1st. ACM Workshop on Continuous Archival and Retrieval of Personal Experiences. Carpe '04. New York, NY, Oct. 15, 2004; [Proceedings of the Workshop on Continuous Archival and Retrieval of Personal Experiences. Carpe], Oct. 15, 2004; Oct. 15, 2004-Oct. 15, 2004 New York, NY : ACM, US, Source info:pp. 22-31.
FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

\* cited by examiner

| | |
|---|---|
| 32 Bit Creation time in Seconds | 701 |
| 32 Bit Duration | 702 |
| 32 Bit Timescale | 703 |
| 32 Bit Number of Bytes in First Video Frame | 704 |
| 32 Bit Number of Bytes in Video Frame #300 | 705 |
| 32 Bit Number of Bytes in Last Video Frame | 706 |
| 32 Bit Number of Audio Samples in Audio Track 0 | 707 |
| 64 Bit Number of bytes in "mdat" atom | 708 |
| 1k Video Data from First Frame | 709 |
| 1k Video Data from Frame 300 (Omit if total video frames <= 300) | 710 |
| 1k Video Data from Last Frame | 711 |
| 1k Audio Raw Data from start of audio (chunk 0) (if num Audio Samples < 12000 samples, skip audio) | 712 |
| 32 Bytes "MUID" udta atom (if present) | 713 |

FIG. 7

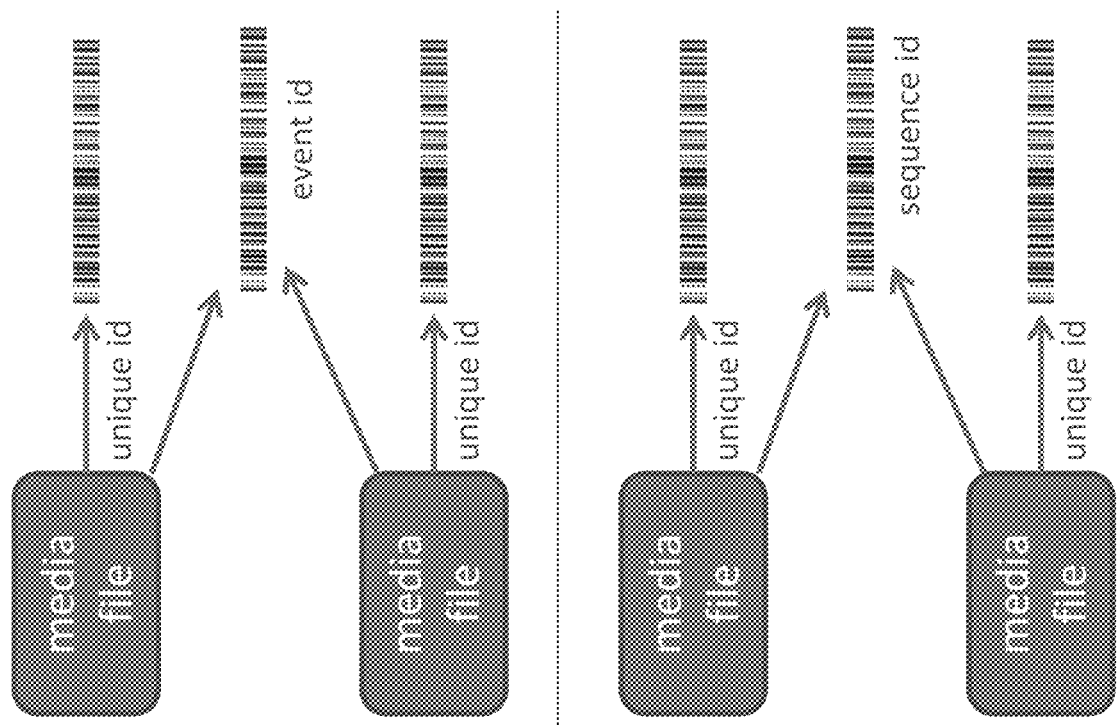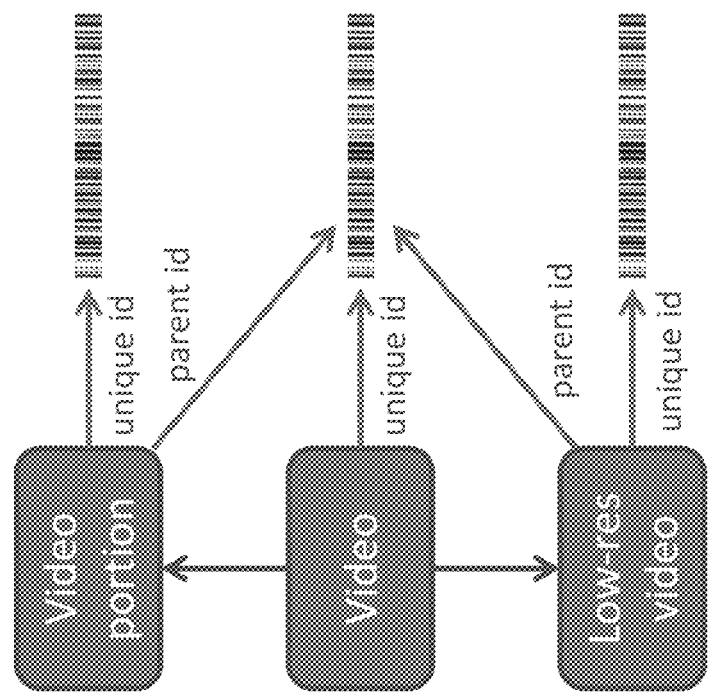
FIG. 9

MEDIA IDENTIFIER GENERATION FOR CAMERA-CAPTURED MEDIA

BACKGROUND

Field of Art

This application relates in general to capturing and processing video and in particular to generating unique media identifiers for videos captured by a camera.

Description of the Relayed Art

Modern cameras may store large amounts of media (e.g., video and images) captured by a user. Users typically edit the large amount of captured information to find interesting video portions and images to show friends. This editing process creates a large number of separate media files derived from the original captured media.

The decreased cost of camera components has increased the number of users capturing a scene from multiple viewpoints. For example, some users employ three-dimensional cameras that capture multiple two-dimensional images from different image sensors for combination into three-dimensional media. As another example, some users record a scene from distinct cameras, such as a helmet camera, a body camera, and a ski tip camera. Each camera or image sensor recording a scene increases the number of resulting media files.

Organizing the large number of resulting media files is difficult. Although a media editor could manually navigate through file folders to select appropriate media, manual navigation is tedious. Such a video storage paradigm is unfriendly to casual users, who may be discouraged from sharing all the interesting moments captured from their cameras because they have insufficient time to organize the media files.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 7 illustrates data extracted from a video to generate a unique media identifier for a video, according to one example embodiment.

FIG. 9 illustrates a set of relationships between videos and video identifiers, according to one example embodiment.

DETAILED DESCRIPTION OF THE INVENTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments include a method comprising steps for generating a media identifier, a non-transitory computer-readable storage medium storing instructions that when executed cause a processor to perform steps to generate a media identifier, and a system for generating a media identifier, where the system comprises the processor and the non-transitory computer-readable medium.

In one embodiment, a video comprising video frames is accessed. The video is associated with video metadata describing the video. Video data corresponding to a subset of the video frames is extracted. An extracted data object is generated. The extracted data objected includes the extracted video data combined with the associated video metadata according to an identifier generation protocol. A unique media identifier is generated by hashing the extracted data object. The generated unique media identifier is stored in association with the video.

Cloud Environment

Figure 1:
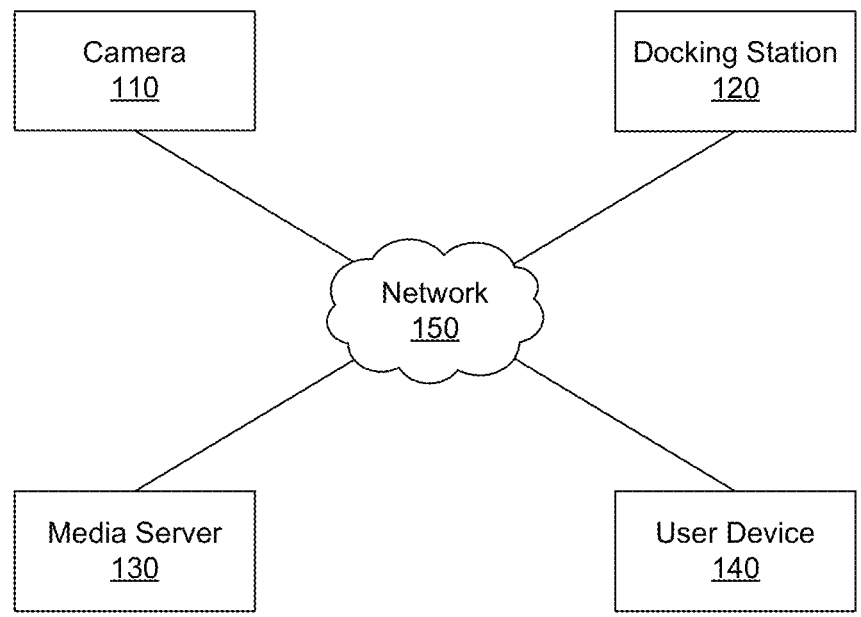
FIG. 1 illustrates a camera system environment for video capture, editing, and viewing, according to one example embodiment.

FIG. 1 illustrates a camera system environment 100 for video capture, editing, and viewing, according to one example embodiment. The environment includes devices including a camera 110, a docking station 120, a media server 130, and a user device 140 communicatively coupled by one or more networks 150. As used herein, either the docking station 120 or the user device 140 may be referred to as a "client device." In alternative configurations, different and/or additional components may be included in the camera system environment 100. For example, one device functions as both a docking station 120 and a user device 140. Although not shown in FIG. 1, the environment may include a plurality of any of the devices.

The camera 110 is a device capable of capturing media (e.g., video, images, audio, associated metadata). Media is a digital representation of information, typically aural or visual information. Videos are a sequence of image frames and may include audio synchronized to the image frames. In some embodiments, a still image may be considered as a video with one image frame. The camera 110 can include a camera body having a camera lens on a surface of the camera body, various indicators on the surface of the camera body (e.g., LEDs, displays, and the like), various input mechanisms (such as buttons, switches, and touch-screen mechanisms), and electronics (e.g., imaging electronics, power electronics, metadata sensors) internal to the camera body for capturing images via the camera lens and/or performing other functions. As described in greater detail in conjunction with FIG. 2 below, the camera 110 can include sensors to capture metadata associated with video data, such as motion data, speed data, acceleration data, altitude data, GPS data, and the like. A user uses the camera 110 to record or capture media in conjunction with associated metadata. The user can edit the media at a later time. The camera may capture HD (high-definition) video, which may have a large resolution (e.g., 1080p, 2K, 4K), a high frame rate (e.g., 120 frames per second), or both.

The docking station 120 stores media captured by a camera 110 communicatively coupled to the docking station 120 to facilitate handling of video. For example, the docking station 120 is a camera-specific device for communicatively coupling a camera, for example, a GOPRO HERO camera, to the media server 130. The camera 110 can be coupled to the docking station 120 by wired means (e.g., a USB (universal serial bus) cable, an HDMI (high-definition multimedia interface) cable) or wireless means (e.g., Wi-Fi, Bluetooth, Bluetooth, 4G LTE (long term evolution)). The docking station 120 can access video data and/or metadata from the camera 110, and can transfer the accessed video data and/or metadata to the media server 130 via the network 150. For example, the docking station is coupled to the camera 110 through a camera interface (e.g., a communication bus, a connection cable) and is coupled to the network 150 through a network interface (e.g., a port, an antenna). The docking station 120 retrieves videos and metadata associated with the videos from the camera via the camera interface and then uploads the retrieved videos and metadata to the media server 130 though the network.

Metadata includes information about the video itself, the camera used to capture the video, and/or the environment or setting in which a video is captured or any other information associated with the capture of the video. For example, the metadata is sensor measurements from an accelerometer or gyroscope communicatively coupled with the camera 110.

Metadata may also include one or more highlight tags, which indicate video portions of interest (e.g., a scene of interest, an event of interest). Besides indicating a time within a video (or a portion of time within the video) corresponding to the video portion of interest, a highlight tag may also indicate a classification of the moment of interest (e.g., an event type, an activity type, a scene classification type). Video portions of interest may be identified according to an analysis of quantitative metadata (e.g., speed, acceleration), manually identified (e.g., by a user through a video editor program), or a combination thereof. For example, a camera 110 records a user tagging a moment of interest in a video through recording audio of a particular voice command, recording one or more images of a gesture command, or receiving selection through an input interface of the camera 110. The analysis may be performed substantially in real-time (during capture) or retrospectively.

The docking station 120 can transcode HD video to LD (lower-definition) video to beneficially reduce the bandwidth consumed by uploading the video and to reduce the memory occupied by the video on the media server 130. Beside transcoding media to different resolutions, frame rates, or file formats, the docking station 120 can perform other tasks including generating edited versions of HD videos and generating identifiers corresponding to HD videos. In one embodiment, the docking station 120 receives instructions from the media server 130 to transcode and upload media, to generate media identifiers relating to the media, or to perform other tasks on media.

The media server 130 receives and stores videos captured by the camera 110 to allow a user to access the videos at a later time. The media server 130 may receive videos via the network 150 from the camera 110 or from a client device (e.g., user device 140 or docking station 120). For instance, a user may edit an uploaded video, view an uploaded or edited video, transfer a video, and the like through the media server 130. In some embodiments, the media server 130 may provide cloud services through one or more physical or virtual servers provided by a cloud computing service. For example, the media server 130 includes geographically dispersed servers as part of a content distribution network.

In one embodiment, the media server 130 provides the user with an interface, such as a web page or native application installed on the user device 140, to interact with and/or edit the videos captured by the user. The media server 130 may use the media identifiers to associate the media with related media to facilitate media editing. For example, the editing interface includes a selection panel with thumbnails of a user's media items. The media items may be grouped based on having in common any of the media identifiers described herein.

In one embodiment, the media server 130 manages uploads of LD and/or HD videos from the client device to the media server 130. For example, the media server 130 allocates bandwidth among client devices uploading videos to limit the total bandwidth of data received by the media server 130 while equitably sharing upload bandwidth among the client devices. In one embodiment, the media server 130 performs tasks on uploaded videos. Example tasks include transcoding a video between formats, generating thumbnails for use by a video player, applying edits, extracting and analyzing metadata, and generating media identifiers. In one embodiment, the media server 130 instructs a client device to perform tasks related to video stored on the client device to beneficially reduce processing resources used by the media server 130.

A user can experience media and interact with interfaces provided by the media server 130 via the user device 140. The user device 140 is any computing device capable of receiving user inputs as well as transmitting and/or receiving data via the network 150. In one embodiment, the user device 140 is a conventional computer system, such as a desktop or a laptop computer. Alternatively, the user device 140 may be a device having computer functionality, such as a smartphone, a tablet, a mobile telephone, a personal digital assistant (PDA), or another suitable device. One or more input devices associated with the user device 140 receive input from the user. For example, the user device 140 can include a touch-sensitive display, a keyboard, a trackpad, a mouse, a voice recognition system, and the like.

The user can use the user device 140 to view and interact with or edit videos stored on the media server 130. For example, the user can view web pages including video summaries for a set of videos captured by the camera 110 via a web browser on the user device 140. In some embodiments, the user device 140 may perform one or more functions of the docking station 120 such as transcoding HD videos to LD videos and uploading videos to the media server 130.

In one embodiment, the user device 140 executes an application allowing a user of the user device 140 to interact with the media server 130. For example, a user can view LD videos stored on the media server 130 and select highlight moments with the user device 140, and the media server 130 generates a video summary from the highlights moments selected by the user. As another example, the user device 140 can execute a web browser configured to allow a user to input video summary properties, which the user device communicates to the media server 130 for storage with the video. In one embodiment, the user device 140 interacts with the media server 130 through an application programming interface (API) running on a native operating system of the user device 140, such as IOS® or ANDROID™. While FIG. 1 shows a single user device 140, in various embodiments, any number of user devices 140 may communicate with the media server 130.

In one embodiment, the user captures media with the camera 110 and transfers the media to a docking station 120 or user device 140. The camera 110 or a client device communicatively coupled to the camera generates a media identifier to uniquely distinguish the media from other media in the camera system environment 100. The camera 110 or client device may generate the media identifier in response to capturing the media, immediately prior to transferring the media, in response to receiving a copy of the captured media, or in response to storing the captured media. The media, or a portion thereof, is transferred to the media server 130 along with the unique media identifier, and the media server 130 stores the media in association with the unique media identifier. Alternatively or additionally, the media is transferred without a unique media identifier, and the media server 130 generates the media identifier in response to receiving uploaded media.

In some embodiments, a device (i.e., any device in the camera system environment 100) generates the unique media identifier by hashing an extracted data object formed from data associated with the media in an order specified by an identifier generation protocol. For a video, the extracted data object includes metadata describing the video as well as video data corresponding to a subset of video frames in the video. For an image, the extracted data object includes metadata describing the image as well as image data corresponding to pixels in the image.

In some embodiments, the media is associated with additional identifiers such as an equipment identifier describing equipment used to capture the media or a shot identifier describing one or more videos captured in physical proximity during at partially overlapping times. Additional identifiers include an occasion identifier describing one or more videos captured during non-overlapping times within a longer time period (e.g., a day, a week) and at a particular geographic location (e.g., a beach, a mountain, a city). The additional identifiers may be associated with media to facilitate organization of the media for editing or sharing. Alternatively or additionally, the additional identifier may be used as metadata included in the extracted data object hashed to generate a unique media identifier.

When an entity in the media environment generates a derivative version of media (e.g., by editing, transcoding, or extracting a thumbnail), the derivative version of media is associated with a new unique media identifier generated from the derivative version. The unique media identifier of the parent media from which the derivative version was generated is also associated with the derivative version. Because the derivative version of the media (also referred to as child media) typically has at least a different start frame or a different end frame from the parent media, the child media typically contains a subset of frames from the parent media. Because the unique media identifier depends on the frames of the video, the child media has a unique media identifier different from the unique media identifier of the parent media. In some embodiments, the unique media identifier depends on a duration value in a video's metadata, so child media clipped from parent media will have a different unique identifier due at least to the changed duration. Even if the child media includes frames derived from all the frames of the parent media, the child media still has a different unique media identifier because the child media typically includes altered frames due to application of transcoding (e.g., compression, format changes), image processing effects (e.g., color shifts, contrast enhancements, brightness adjustments), or video processing effects (e.g., playback speed modifications, audio filtering).

The camera 110, the docking station 120, the media server 130, and the user device 140 communicate with each other via the network 150, which may include any combination of local area and/or wide area networks, using both wired (e.g., Ti, optical, cable, DSL) and/or wireless communication systems (e.g., WiFi, mobile). In one embodiment, the network 150 uses standard communications technologies and/or protocols. In some embodiments, all or some of the communication links of the network 150 may be encrypted using any suitable technique or techniques. It should be noted that in some embodiments, the media server 130 is located within the camera 110 itself.

Example Camera Configuration

Figure 2:
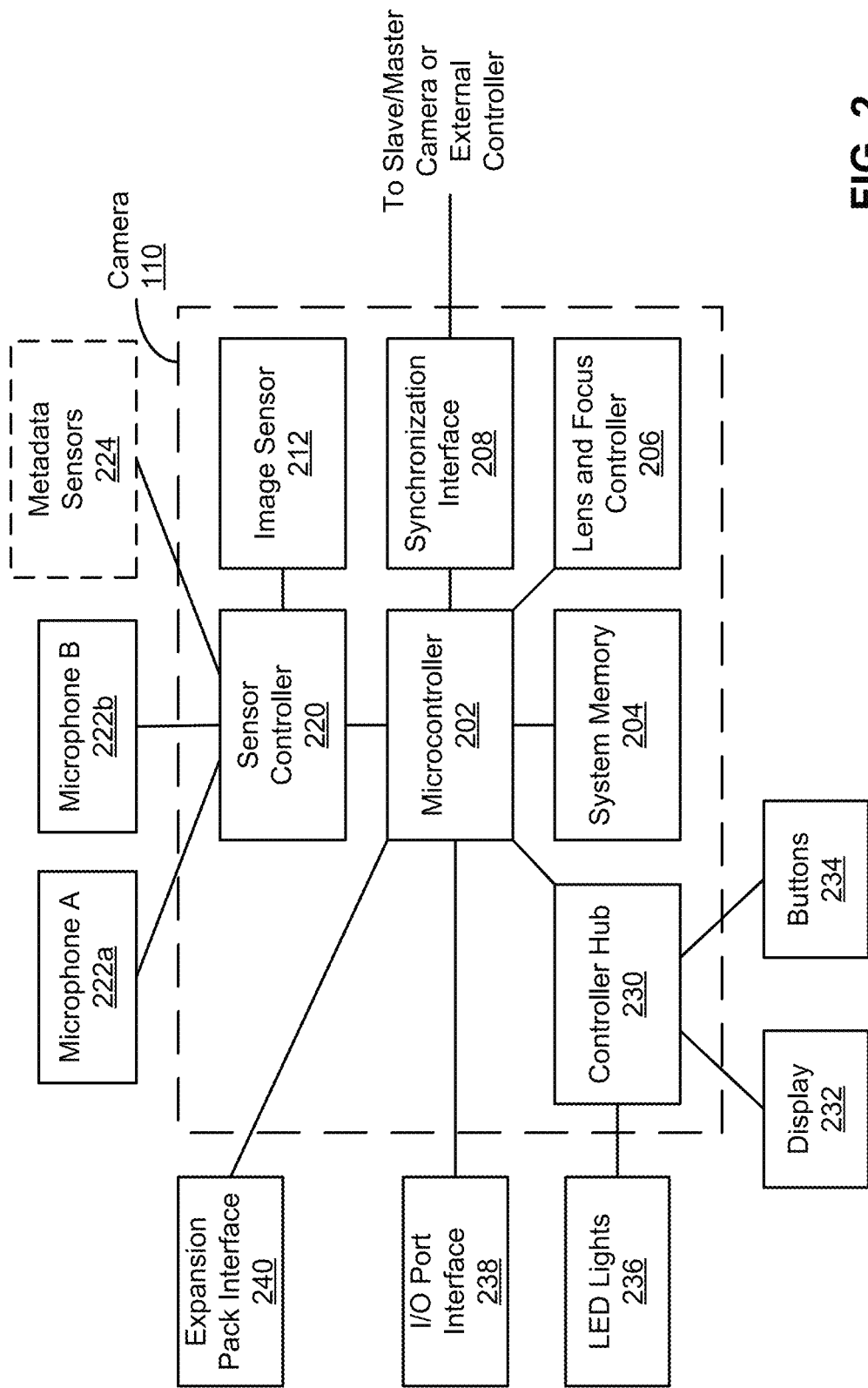
FIG. 2 is a block diagram illustrating a camera system, according to one example embodiment.

FIG. 2 is a block diagram illustrating a camera system, according to one embodiment. The camera 110 includes one or more microcontrollers 202 (such as microprocessors) that control the operation and functionality of the camera 110. A lens and focus controller 206 is configured to control the operation and configuration of the camera lens. A system memory 204 is configured to store executable computer instructions that, when executed by the microcontroller 202, perform the camera functionalities described herein. It is noted that the microcontroller 202 is a processing unit and may be augmented with or substituted by a processor. A synchronization interface 208 is configured to synchronize the camera 110 with other cameras or with other external devices, such as a remote control, a second camera 110, a camera docking station 120, a smartphone or other user device 140, or a media server 130.

A controller hub 230 transmits and receives information from various I/O components. In one embodiment, the controller hub 230 interfaces with LED lights 236, a display 232, buttons 234, microphones such as microphones 222$a$ and 222$b$, speakers, and the like.

A sensor controller 220 receives image or video input from an image sensor 212. The sensor controller 220 receives audio inputs from one or more microphones, such as microphone 222$a$ and microphone 222$b$. The sensor controller 220 may be coupled to one or more metadata sensors 224 such as an accelerometer, a gyroscope, a magnetometer, a global positioning system (GPS) sensor, or an altimeter, for example. A metadata sensor 224 collects data measuring the environment and aspect in which the video is captured. For example, the metadata sensors include an accelerometer, which collects motion data, comprising velocity and/or acceleration vectors representative of motion of the camera 110; a gyroscope, which provides orientation data describing the orientation of the camera 110; a GPS sensor, which provides GPS coordinates identifying the location of the camera 110; and an altimeter, which measures the altitude of the camera 110.

The metadata sensors 224 are coupled within, onto, or proximate to the camera 110 such that any motion, orientation, or change in location experienced by the camera 110 is also experienced by the metadata sensors 224. The sensor controller 220 synchronizes the various types of data received from the various sensors connected to the sensor controller 220. For example, the sensor controller 220 associates a time stamp representing when the data was captured by each sensor. Thus, using the time stamp, the measurements received from the metadata sensors 224 are correlated with the corresponding video frames captured by the image sensor 212. In one embodiment, the sensor controller begins collecting metadata from the metadata sources when the camera 110 begins recording a video. In one embodiment, the sensor controller 220 or the microcontroller 202 performs operations on the received metadata to generate additional metadata information. For example, the microcontroller 202 may integrate the received acceleration data to determine the velocity profile of the camera 110 during the recording of a video.

Additional components connected to the microcontroller 202 include an I/O port interface 238 and an expansion pack interface 240. The I/O port interface 238 may facilitate the receiving or transmitting video or audio information through an I/O port. Examples of I/O ports or interfaces include USB ports, HDMI ports, Ethernet ports, audioports, and the like. Furthermore, embodiments of the I/O port interface 238 may include wireless ports that can accommodate wireless connections. Examples of wireless ports include Bluetooth, Wireless USB, Near Field Communication (NFC), and the like. The expansion pack interface 240 is configured to interface with camera add-ons and removable expansion packs, such as a display module, an extra battery module, a wireless module, and the like.

Example Client Device Architecture

Figure 3:
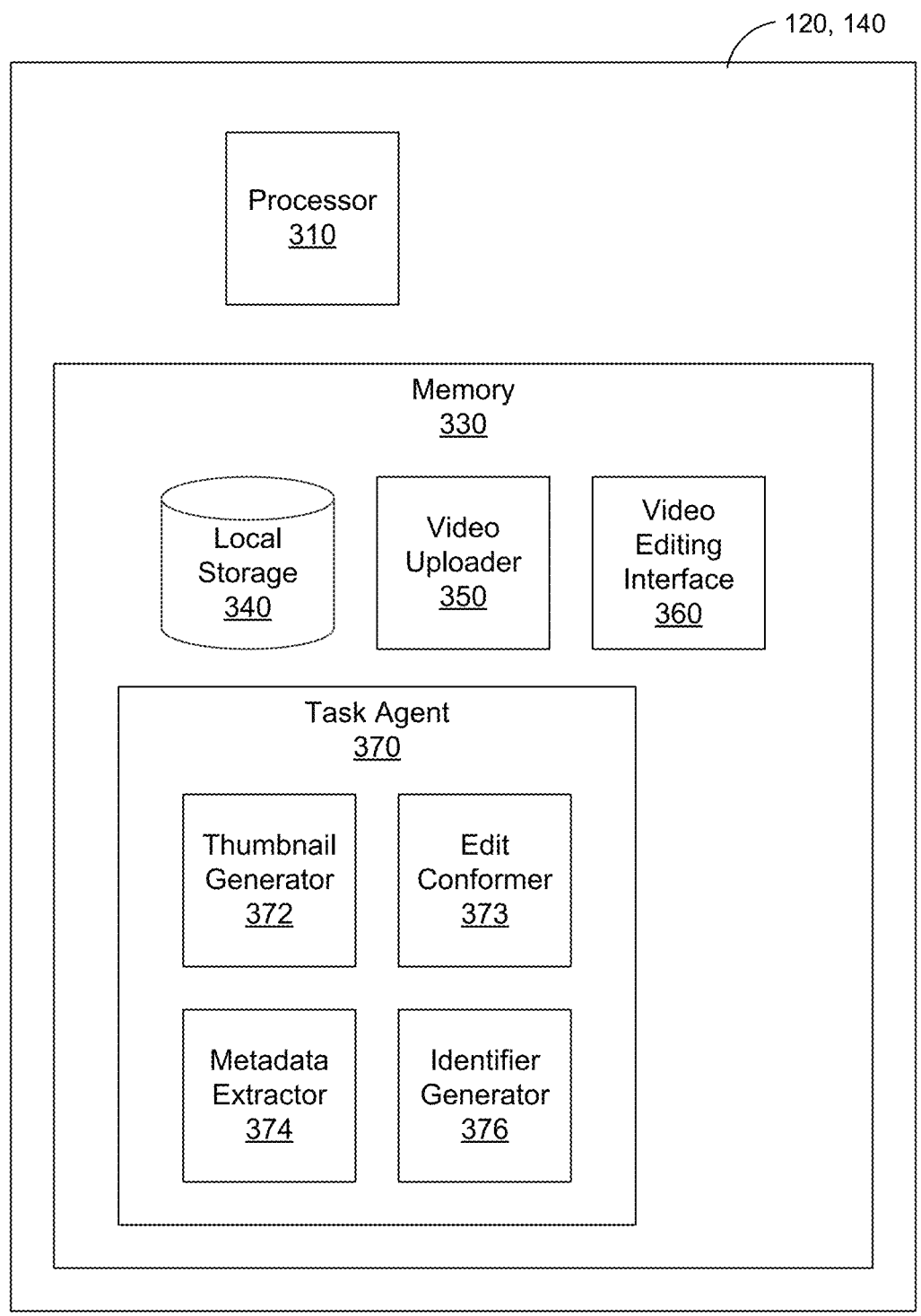
FIG. 3 is a block diagram of an architecture of a client device (such as a camera docking station or a user device), according to one example embodiment.

FIG. 3 is a block diagram of an architecture of a client device (such as a camera docking station 120 or a user device 140), according to one embodiment. The client device includes a processor 310 and a memory 330. Conventional components, such as power sources (e.g., batteries, power adapters) and network interfaces (e.g., micro USB port, an Ethernet port, a Wi-Fi antenna, or a Bluetooth antenna, supporting electronic circuitry), are not shown to so as to not obscure the details of the system architecture.

The processor 310 includes one or more computational nodes, such as a central processing unit (CPU), a core of a multi-core CPU, a graphics processing unit (GPU), a microcontroller, an application-specific integrated circuit (ASIC), a field programmable gate array (FPGA), or other processing device such as a microcontroller or state machine. The memory 330 includes one or more computer-readable media, including non-volatile memory (e.g., flash memory), and volatile memory (e.g., dynamic random access memory (DRAM)).

The memory 330 stores instructions (e.g., computer program code) executable by the processor 310 to provide the client device functionality described herein. The memory 330 includes instructions for modules. The modules in FIG. 3 include a video uploader 350, a video editing interface 360, and a task agent 370. In other embodiments, the media server 130 may include additional, fewer, or different components for performing the functionalities described herein. For example, the video editing interface 360 is omitted when the client device is a docking station 120. As another example, the client device includes multiple task agents 370. Conventional components, such as input/output modules to manage communication with the network 150 or the camera 110, are not shown.

Also illustrated in FIG. 3 is a local storage 340, which may be a database and/or file system of memory 330. The local storage 340 stores videos, images, and recordings transferred from a camera 110 as well as associated metadata. In one embodiment, a camera 110 is paired with the client device through a network interface (e.g., a port, an antenna) of the client device. Upon pairing, the camera 110 sends media stored thereon to the client device (e.g., through a Bluetooth or USB connection), and the client device stores the media in the local storage 340. For example, the camera 110 can transfer 64 GB of media to the client device in a few minutes. In some embodiments, the client device identifies media captured by the camera 110 since a recent transfer of media from the camera 110 to the client device 120. Thus, the client device can transfer media without manual intervention by a user. The media may then be uploaded to the media server 130 in whole or in part. For example, an HD video is uploaded to the media server 130 when the user elects to post the video to a social media platform. The local storage 340 can also store modified copies of media. For example, the local storage 340 includes LD videos transcoded from HD videos captured by the camera 110. As another example, the local storage 340 stores an edited version of an HD video.

The video uploader 350 sends media from the client device to the media server 130. In some embodiments, in response to the HD video being transferred to the client device from a camera and transcoded by the device, a unique media identifier is generated for the transcoded LD video. The transcoded LD video is automatically uploaded to the media server 130. Alternatively or additionally, a user can manually select LD video to upload to the media server 130. The uploaded LD video can be associated with an account of the user, for instance allowing a user to access the uploaded LD video via a cloud media server portal, such as a website.

In one embodiment, the media server 130 controls the video uploader 350. For example, the media server 130 determines which videos are uploaded, the priority order of uploading the videos, and the upload bitrate. The uploaded media can be HD videos from the camera 110, transcoded LD videos, or edited portions of videos. In some embodiments, the media server 130 instructs the video uploader 350 to send videos to another client device. For example, a user on vacation transfers HD videos from the user's camera 110 to a smart phone user device 140, which the media server 130 instructs to send the HD videos to the user's docking station 120 at home while the smart phone user device 140 has Wi-Fi connectivity to the network 150. Video uploading is described further in conjunction with FIGS. 4 and 5.

The video editing interface 360 allows a user to browse media and edit the media. The client device can retrieve the media from local storage 340 or from the media server 130. For example, the user browses LD videos retrieved from the media server on a smart phone user device 140. In one embodiment, the user edits an LD video to reduce processing resources when generating previews of the modified video. In one embodiment, the video editing interface 360 applies edits to an LD version of a video for display to the user and generates an edit task list to apply the edits to an HD version of the video. The edit decision list encodes a series of flags (or sequencing files) that describe tasks to generate the edited video. For example, the edit decision list identifies portions of video and the types of edits performed on the identified portions.

Editing a video can include specifying video sequences, scenes, or portions of the video ("portions" collectively herein), indicating an order of the identified video portions, applying one or more effects to one or more of the portions (e.g., a blur effect, a filter effect, a change in frame rate to create a time-lapse or slow motion effect, any other suitable video editing effect), selecting one or more sound effects to play with the video portions (e.g., a song or other audio track, a volume level of audio), or applying any other suitable editing effect. Although editing is described herein as performed by a user of the client device, editing can also be performed automatically (e.g., by a video editing algorithm or template at the media server 130) or manually by a video editor (such as an editor-for-hire associated with the media server 130). In some embodiments, the editor-for-hire may access the video only if the user who captured the video configures an appropriate access permission.

The task agent 370 obtains task instructions to perform tasks (e.g., to modify media and/or to process metadata associated with the media). The task agent 370 can perform tasks under the direction of the media server 130 or can perform tasks requested by a user of the client device (e.g., through the video editing interface 360). The client device can include multiple task agents 370 to perform multiple tasks simultaneously (e.g., using multiple processing nodes) or a single task agent 370. The task agent 370 also includes one or more modules to perform tasks. These modules include a thumbnail generator 372, an edit conformer 373, a metadata extractor 374, and an identifier generator 376. The task agent 370 may include additional modules to perform additional tasks, may omit modules, or may include a different configuration of modules.

The thumbnail generator 372 obtains thumbnail instructions and outputs a thumbnail, which is an image generated from a portion of a video. A thumbnail refers to an image extracted from a source video. The thumbnail may be at the same resolution as the source video or may have a different resolution (e.g., a low-resolution preview thumbnail). The thumbnail may be generated directly from a frame of the video or interpolated between successive frames of a video. The thumbnail instructions identify the source video and the one or more frames of the video to generate the thumbnail, and other properties of the thumbnail (e.g., file format, resolution). The thumbnail instructions may be generated by a user (e.g., through a frame capture command on the video editing interface 360) or automatically (e.g., to generate a preview thumbnail of the video in a video viewing interface). The thumbnail generator 372 may generate a low-resolution thumbnail, or the thumbnail generator 372 may retrieve an HD version of the video to generate a high-resolution thumbnail. For example, while previewing an LD version of the video on a smart phone user device 140, a user selects a frame of a video to email to a friend, and the thumbnail generator 372 prepares a high-resolution thumbnail to insert in the email. In the example, the media server 130 instructs the user's docking station 120 to generate the high-resolution thumbnail from a locally stored HD version of the video and to send the high-resolution frame to the smart phone user device 140.

In response to generation of a thumbnail from a video, the video identifier generator 376 creates a unique media identifier for the thumbnail, which is stored in association with the thumbnail. Additionally, the thumbnail is stored in association with the unique media identifier of the video from which the thumbnail was generated.

The edit conformer 373 obtains an edit decision list (e.g., from the video editing interface 360) and generates an edited video based on the edit decision list. The edit conformer 373 retrieves the portions of the HD video identified by the edit decision list and performs the specified edit tasks. For instance, an edit decision list identifies three video portions, specifies a playback speed for each, and identifies an image processing effect for each. As another example, the edit decision list includes transcoding instructions to apply to a video or a portion of the video. Transcoding instructions identify the portion of media to be transcoded and properties of the transcoded video (e.g., file format, resolution, frame rate). To process the example edit decision list, the edit conformer 373 of the client device storing the HD video accesses the identified three video portions, edits each by implementing the corresponding specified playback speed, applies the corresponding identified image processing effect, and combines the edited portions to create an edited HD video.

In response to generating the edited version of a video, the identifier generator 376 generates a media identifier based on the edited version of the video. The edited version of the video may be stored as a separate video from the original video, or the edited version may override the original video. In either case, the edited video is associated with the parent media identifier of the original video.

The metadata extractor 374 obtains metadata instructions and outputs analyzed metadata based on the metadata instructions. Metadata includes information about the video itself, the camera 110 used to capture the video, or the environment or setting in which a video is captured or any other information associated with the capture of the video. Examples of metadata include: telemetry data (such as motion data, velocity data, and acceleration data) captured by sensors on the camera 110; location information captured by a GPS receiver of the camera 110; compass heading information; altitude information of the camera 110; biometric data such as the heart rate of the user, breathing of the user, eye movement of the user, body movement of the user, and the like; vehicle data such as the velocity or acceleration of the vehicle, the brake pressure of the vehicle, or the rotations per minute (RPM) of the vehicle engine; or environment data such as the weather information associated with the capture of the video. Metadata may also include identifiers associated with media (described in further detail in conjunction with the identifier generator 376) and user-supplied descriptions of media (e.g., title, caption).

Metadata instructions identify a video, a portion of the video, and the metadata task. Metadata tasks include generating condensed metadata from raw metadata samples in a video. Condensed metadata may summarize metadata samples temporally or spatially. To obtain the condensed metadata, the metadata extractor 374 groups metadata samples along one or more temporal or spatial dimensions into temporal and/or spatial intervals. The intervals may be consecutive or non-consecutive (e.g., overlapping intervals representing data within a threshold of a time of a metadata sample). From an interval, the metadata extractor 374 outputs one or more pieces of condensed metadata summarizing the metadata in the interval (e.g., using an average or other measure of central tendency, using standard deviation or another measure of variance). The condensed metadata summarizes metadata samples along one or more different dimensions than the one or more dimensions used to group the metadata into intervals. For example, the metadata extractor performs a moving average on metadata samples in overlapping time intervals to generate condensed metadata having a reduced sampling rate (e.g., lower data size) and reduced noise characteristics. As another example, the metadata extractor 374 groups metadata samples according to spatial zones (e.g., different segments of a ski run) and outputs condensed metadata representing metadata within the spatial zones (e.g., average speed and acceleration within each spatial zone).

The metadata extractor 374 may perform other metadata tasks such as identifying highlights or events in videos from metadata for use in video editing (e.g., automatic creation of video summaries). For example, metadata can include acceleration data representative of the acceleration of a camera 110 attached to a user as the user captures a video while snowboarding down a mountain. Such acceleration metadata helps identify events representing a sudden change in acceleration during the capture of the video, such as a crash or landing from a jump. Generally, the metadata extractor 374 may identify highlights or events of interest from an extremum in metadata (e.g., a local minimum, a local maximum) or a comparison of metadata to a threshold metadata value. The metadata extractor 374 may also identify highlights from processed metadata such as derivative of metadata (e.g., a first or second derivative) an integral of metadata, smoothed metadata (e.g., a moving average, a local curve fit or spline), or a combination thereof. As another example, a user may audibly "tag" a highlight moment by saying a cue word or phrase while capturing a video. The metadata extractor 374 may subsequently analyze the sound from a video to identify instances of the cue phrase and to identify portions of the video recorded within a threshold time of an identified instance of the cue phrase.

In another metadata task, the metadata extractor 374 analyzes the content of a video to generate metadata. For example, the metadata extractor 374 takes as input video captured by the camera 110 in a variable bit rate mode and generates metadata describing the bit rate. Using the metadata generated from the video, the metadata extractor 374 may identify potential scenes or events of interest. For example, high-bit rate portions of video can correspond to portions of video representative of high amounts of action within the video, which in turn can be determined to be video portions of interest to a user. The metadata extractor 374 identifies such high-bit rate portions for use by a video creation algorithm in the automated creation of an edited video with little to no user input. Thus, metadata associated with captured video can be used to identify best scenes in a video recorded by a user with fewer processing steps than used by image processing techniques and with more user convenience than manual curation by a user.

The metadata extractor 374 may obtain metadata directly from the camera 110 (e.g., the metadata is transferred along with video from the camera), from a user device 140 (such as a mobile phone, computer, or vehicle system associated with the capture of video), an external sensor paired with the camera 110 or user device 140, or from external metadata sources 110 such as web pages, blogs, databases, social networking sites, servers, or devices storing information associated with the user (e.g., a fitness device recording activity levels and user biometrics).

The identifier generator 376 obtains identifier instructions to generate an identifier for media and associates the generated identifier with the media. The identifier instructions identify the media to be identified by the unique identifier and may identify any relationships of the media to other media items, equipment used to capture the media item, and other context related to capturing the media item. In some embodiments, the identifier generator 376 registers generated identifiers with the media server 130, which verifies that an identifier is unique (e.g., if an identifier is generated based at least in part on pseudo-random numbers). In other embodiments, the identifier generator 376 is implemented within the media server 130 and maintains a register of issued identifiers to avoid associating media with a duplicate identifier used by an unrelated media item.

In some embodiments, the identifier generator 376 generates unique media identifiers for a media item based on the content of the media and metadata associated with the media. For example, the identifier generator 376 selects portions of a media item and/or portions of metadata and then hashes the selected portions to output a unique media identifier.

In some embodiments, the identifier generator 376 associates media with unique media identifiers of related media. In one embodiment, the identifier generator associates a child media item derived from a parent media item with the unique media identifier of the parent media item. This parent unique media identifier (i.e., the media identifier generated based on the parent media) indicates the relationship between the child media and the parent media. For example, if a thumbnail image is generated from a video image, the thumbnail image is associated with (a) a unique media identifier generated based at least in part on the content of the thumbnail image and (b) a parent unique media identifier generated based at least in part on the content of the parent video. Grandchild media derived from child media of an original media file may be associated with the unique media identifiers of the original media file (e.g., a grandparent unique media identifier) and the child media (e.g., a parent unique media identifier). Generation of unique media identifiers is described further with respect to FIGS. 6-9.

In some embodiments, the identifier generator 376 associates media with an equipment identifier describing equipment used to capture the media and associates the media with the obtained equipment identifier. Equipment identifiers include a device identifier of the camera used to capture the media. For example, a camera's serial number is the device identifier associated with media captured by the camera. Device identifiers also include sensor identifiers (e.g., serial numbers) of metadata sensors communicatively coupled to the camera. For example, media captured by a skier includes device identifiers for the camera and a sensor identifier of communicatively coupled metadata sensor such as an altimeter, accelerometer, or thermometer. Alternatively or additionally, media captured by the example camera is associated with a compound device identifier indicating the camera-metadata sensor combination. Compound device identifiers may be formed by hashing or concatenating the camera identifier and sensor identifier.

Equipment identifiers also include a rig identifier of a camera rig, which is a group of cameras (e.g., camera 110) that records multiple fields of view from the camera rig. For example, a camera rig includes left and right cameras to capture three-dimensional video, or cameras to capture three-hundred-sixty-degree video, or cameras to capture spherical video. In some embodiments, the rig identifier is a serial number of the camera rig, or is based on the device identifiers of cameras in the camera rig (e.g., through concatenating or hashing of the device identifiers). A camera rig may include multiple image sensors (each associated with a camera identifier) housed in a single housing or multiple cameras 110 mechanically coupled, communicatively coupled, or both by a modular connector.

Equipment identifiers may include camera group identifiers. A camera group identifier identifies one or more cameras 110 and/or camera rigs in physical proximity and used to record multiple perspectives in one or more shots. For example, two chase skydivers each have a camera 110, and a lead skydiver has a spherical camera rig. In this example, media captured by the cameras 110 of the spherical camera rig have the same rig identifier, and all the media captured by the chase skydivers and lead skydivers has the same camera group identifier. Camera group identifiers may be generated from an arrangement (e.g., concatenation) or manipulation (e.g., hash) of the device identifiers (or portions thereof) of the constituent cameras 110 and/or camera rigs, a start or end time associated with the camera group, a random identifier, or a combination thereof.

In one embodiment, the identifier generator 376 associates videos with a common camera group identifier by determining that the cameras 110 that captured the videos are part of common camera group. For example, the identifier generator 376 groups cameras 110 into a camera group in response to metadata describing positions of the cameras 110 and determines that the cameras 110 are part of a camera group in response to the cameras 110 being within a threshold distance (e.g., 1 meter, 3 meters, 10 meters, 30 meters, 100 meters) at a common time. Alternatively or additionally, the identifier generator 376 groups cameras 110 into a camera group in response to metadata indicating that cameras were communicatively coupled (e.g., via Bluetooth) at a common time or under control by a master device controlling capture, such as a master camera 110 included in the cameras or a separate client device. The identifier generator 376 assigns a camera group identifier to the cameras 110 in the camera group. The identifier generator 376 then associates videos captured at the common time (i.e., having the common time between each video's start timestamp and end timestamp) with the camera group identifier assigned to the camera group.

In some embodiments, the identifier generator 376 generates context identifiers based at least in part on device unique identifiers and/or rig unique identifiers of devices and/or camera rigs in the camera group. The identifier generator 376 obtains a context identifier describing context in which the media was captured and associates the media with the context identifier. Obtaining a context identifier includes generating a context identifier or accessing a previously generated context identifier.

Context identifiers include shot identifiers, which correspond to videos captured at least partially at overlapping times by a camera group as part of a "shot." For example, each time a camera group begins a synchronized capture, the identifier generator 376 determines that media resulting from the synchronized capture are part of a shot. Thus, videos recorded by a camera group during a production session may have a common camera group identifier but different shot identifiers corresponding to different shots during the production session. In response to identifying media as part of a shot, the identifier generator 376 associates the media captured by the have a same shot identifier. In some embodiments, the shot identifier is based at least in part on a hash of the time a shot begins, the time a shot ends, the geographical location of the shot, and/or one or more equipment identifiers of camera equipment used to capture a shot.

In some embodiments, a video editor segments videos having a common shot identifier into multiple temporal portions (e.g., each corresponding to an event of interest). The resulting videos derived from portions of the initial videos may each be associated with an additional shot identifier to indicate which videos correspond to a common temporal portion. For example, a camera group of four cameras captures 4 videos from a common time period 10 minutes in duration, and an editor identifies three distinct events of interests occurring between 1-2 minutes, 5-6 minutes, and 8-9 minutes from the start of the shot. In the example, the edit results in twelve videos, where there are four videos (one for each camera) corresponding to each event of interest. The identifier generator 376 associates the four videos corresponding to each event of interest with an additional shot identifier for that portion in addition to (or in place of) a shot identifier corresponding to the initial 10 minutes for the initial 4 uncut videos.

Context identifiers also include occasion identifiers, which indicate media captured as part of several shots during an occasion. Videos having a common occasion may encompass multiple video shots. Occasions may be identified from videos shot in a common time range. Alternatively or additionally, videos having a common occasion may also be identified based at least in part on a common geographical location (e.g., shots within a threshold radius of a geographical coordinate), a common subject matter, or both. Occasions may be defined by a user curating media, or the identifier generator 376 may cluster media into occasions based on associated time of capture, geographical location, or other metadata associated with media. Example occasions encompass shots taken during a day skiing champagne powder, shots taken during a multi-day hiking trek, or shots taken during a family trip to an amusement park. In some embodiments, an occasion identifier is based at least in part on a user description of an occasion or on a hash of a time, location, user description, or shot identifier of a shot included in the occasion.

Example Media Server Architecture

Figure 4:
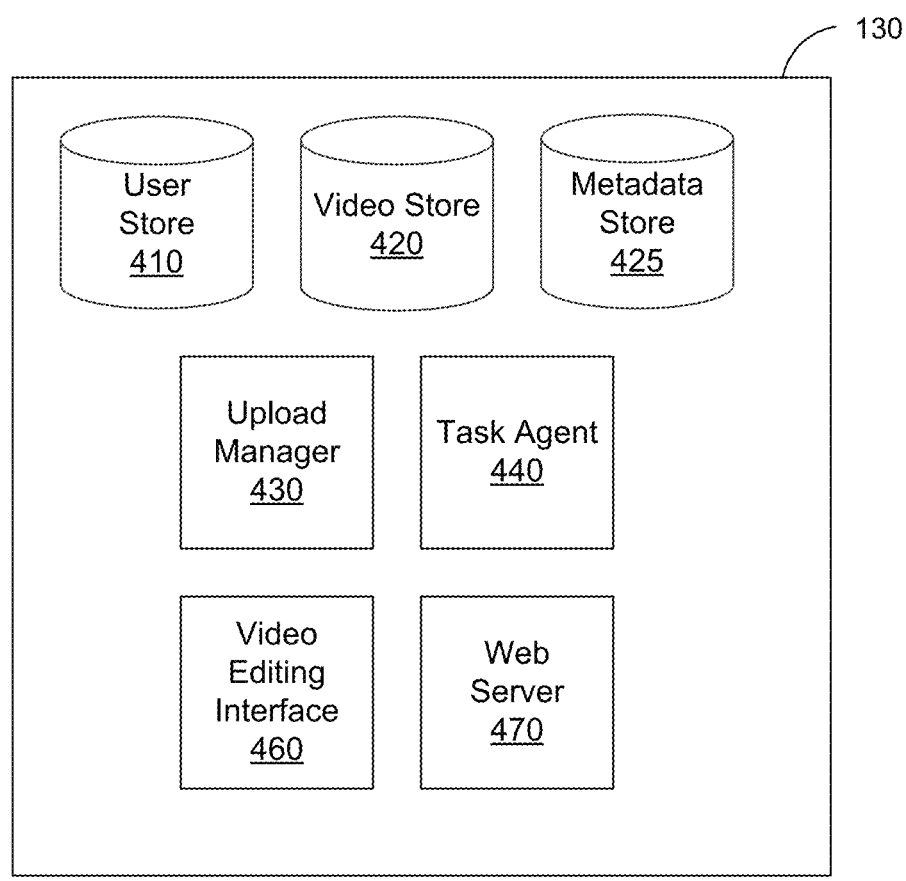
FIG. 4 is a block diagram of an architecture of a media server, according to one example embodiment.

FIG. 4 is a block diagram of an architecture of a media server 130, according to one embodiment. The media server 130 includes a user store 410, a video store 420, an upload manager 430, a task agent 440, a video editing interface 460, and a web server 470. In other embodiments, the media server 130 may include additional, fewer, or different components for performing the functionalities described herein. For example, the task agent 470 is omitted. Conventional components such as network interfaces, security functions, load balancers, failover servers, management and network operations consoles, and the like are not shown so as to not obscure the details of the system architecture.

Each user of the media server 130 creates a user account, and user account information is stored in the user store 410. A user account includes information provided by the user (such as biographic information, geographic information, and the like) and may also include additional information inferred by the media server 130 (such as information associated with a user's previous use of a camera). Examples of user information include a username, a first and last name, contact information, a user's hometown or geographic region, other location information associated with the user, and the like. The user store 410 may include data describing interactions between a user and videos captured by the user. For example, a user account can include a unique identifier associating videos uploaded by the user with the user's user account.

The media store 420 stores media captured and uploaded by users of the media server 130. The media server 130 may access videos captured using the camera 110 and store the videos in the media store 420. In one example, the media server 130 may provide the user with an interface executing on the user device 140 that the user may use to upload videos to the video store 315. In one embodiment, the media server 130 indexes videos retrieved from the camera 110 or the user device 140, and stores information associated with the indexed videos in the video store. For example, the media server 130 provides the user with an interface to select one or more index filters used to index videos. Examples of index filters include but are not limited to: the type of equipment used by the user (e.g., ski equipment, snowboard equipment, mountain bike equipment, scuba diving equipment, etc.), the type of activity being performed by the user while the video was captured (e.g., skiing, snowboarding, mountain biking, scuba diving, etc.), the time and data at which the video was captured, or the type of camera 110 used by the user.

In some embodiments, the media server 130 generates a unique identifier for each video stored in the media store 420. In some embodiments, the generated identifier for a particular video is unique to a particular user. For example, each user can be associated with a first unique identifier (such as a 10-digit alphanumeric string), and each video captured by a user is associated with a second unique identifier made up of the first unique identifier associated with the user concatenated with a video identifier (such as the unique media identifier described with respect to the identifier generator 376 and FIGS. 6-9). Thus, each video identifier is unique among all videos stored at the media store 420, and can be used to identify the user that captured the video.

The metadata store 425 stores metadata associated with videos stored by the media store 420. For instance, the media server 130 can retrieve metadata from the camera 110, the user device 140, or one or more metadata sources 110. The metadata store 425 may include one or more identifiers associated with media (e.g., unique media identifier, device identifier, equipment identifier, shot identifier, occasion identifier). The metadata store 425 can store any type of metadata, including but not limited to the types of metadata described herein. It should be noted that in some embodiments, metadata corresponding to a video is stored within a video file itself, and not in a separate storage.

The upload manager 430 obtains an upload policy and instructs client devices to upload media based on the upload policy. The upload policy indicates which media may be uploaded to the media server 130 and how to prioritize among a user's media as well as how to prioritize among uploads from different client devices. The upload manager 430 obtains registration of media available in the local storage 340 but not uploaded to the media server 130. For example, the client device registers HD videos when transferred from a camera 110 and registers LD videos upon completion of transcoding from HD videos. The upload manager 430 selects media for uploading to the media server 130 from among the registered media based on the upload policy. For example, the upload manager 430 instructs client devices to upload LD videos and edited HD videos but not raw HD videos.

The media server 130 may include one or more task agents 440 to provide one or more of the functionalities described above with respect to the task agents 370 or FIG. 3. Task agents 440 included in the media server 130 may provide different functionality (e.g., a different subset of the functionalities described with respect to modules 372, 373, 374, 376) from task agents 370 included in the client device.

The media server 130 may include a video editing interface 460 to provide one or more of the editing functionalities described above with respect to the video editing interface 360 of FIG. 3. The video editing interface 360 provided by the media server 130 may differ from the video editing interface 360 provided by a client device. For example, different client devices have different video editing interfaces 360 (in the form of native applications) that provide different functionalities due to different display sizes and different input means. As another example, the media server 130 provides the video editing interface 460 as a web page or browser application accessed by client devices.

The web server 470 provides a communicative interface between the media server 130 and other entities of the environment of FIG. 1. For example, the web server 470 can access videos and associated metadata from the camera 110 or a client device to store in the media store 420 and the metadata store 425, respectively. The web server 470 can also receive user input provided to the user device 140 and can request videos stored on a user's client device when the user request's the video from another client device.

Uploading Media

Figure 5:
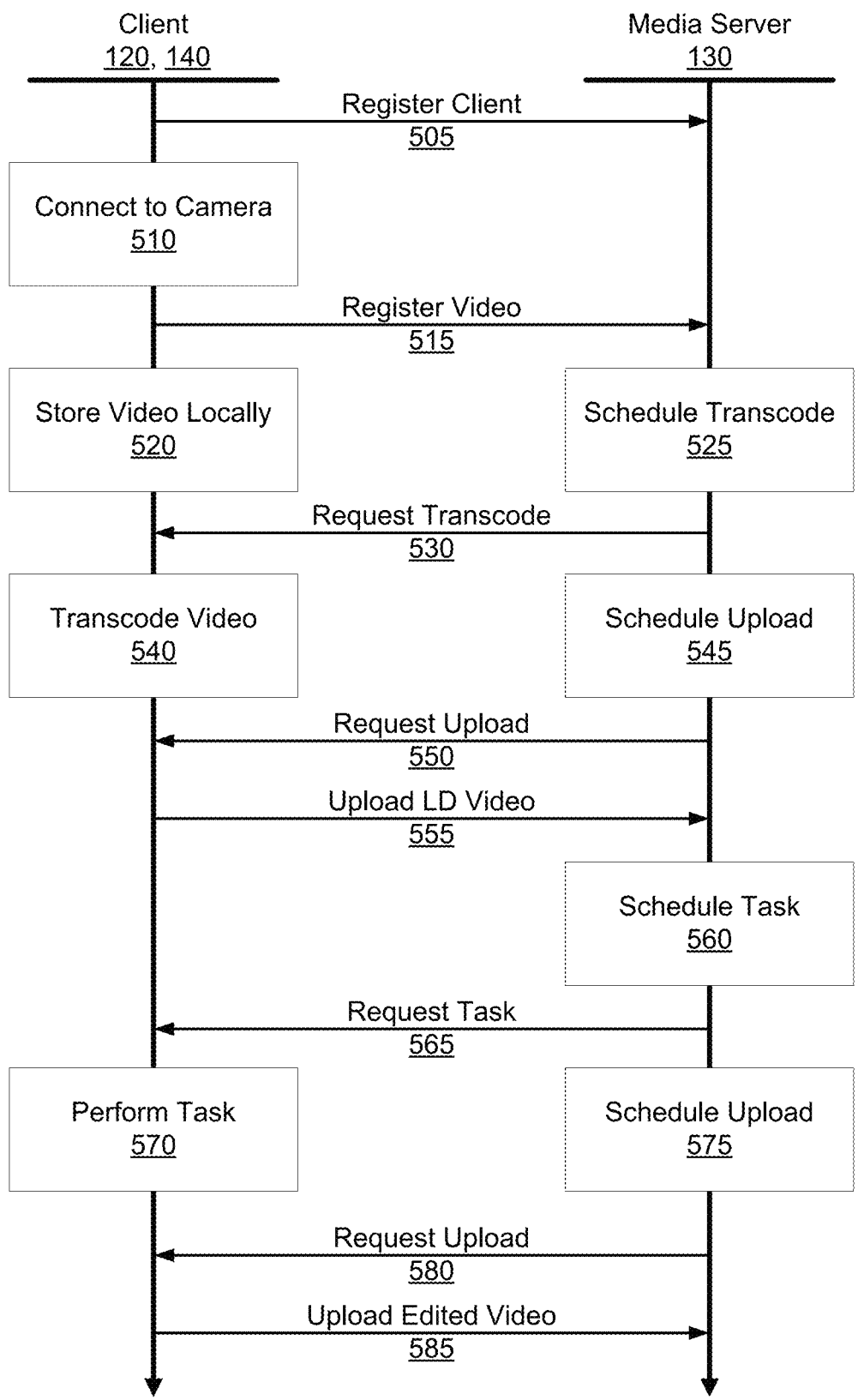
FIG. 5 is an interaction diagram illustrating processing of a video by a camera docking station and a media server, according to one example embodiment.

FIG. 5 is an interaction diagram illustrating processing of a video by a camera docking station and a media server, according to one embodiment. Different embodiments may include additional or fewer steps in different order than that described herein.

A client device registers 505 with the media server 130. Registering 505 a client device includes associating the client device with one or more user accounts, but some embodiments may provide for uploading a video without creating a user account or with a temporary user account. Registering the media may include transmitting a unique media identifier generated for the video. The client device subsequently connects 510 to a camera 110 (e.g., through a dedicated docking port, through Wi-Fi or Bluetooth). As part of connecting 510, media stored on the camera 110 is transferred to the client device, and may be stored 520 locally (e.g., in local storage 340). For example, the client device requests the video using the unique media identifier, and the camera 110 retrieves the video using the unique media identifier and transfers the video in response to the request. The client device registers 515 the video with the media server 130. Registering the video may include transmitting the unique media identifier, which may be generated by the camera 110 or the client device, and the video's file size. For example, the media server 130 creates a unique entry in the video store 420 that include the video's unique media identifier and file size. Alternatively or additionally, a video is registered with the media server 130 using a temporary identifier, and the media server 130 generates a unique media identifier and sends the unique media identifier to the client device and/or camera 110 for association with the video.

The client device may send a device status report to the media server 130 as part registering 515 a video, registering the client device, or any subsequent communication with the media server 130. The device report may include quantitative metrics, qualitative metrics, and/or alerts describing client device resources (e.g., memory resources, processing resources, power resources, connectivity resources).

Generating Unique Media Identifiers

Figure 6:
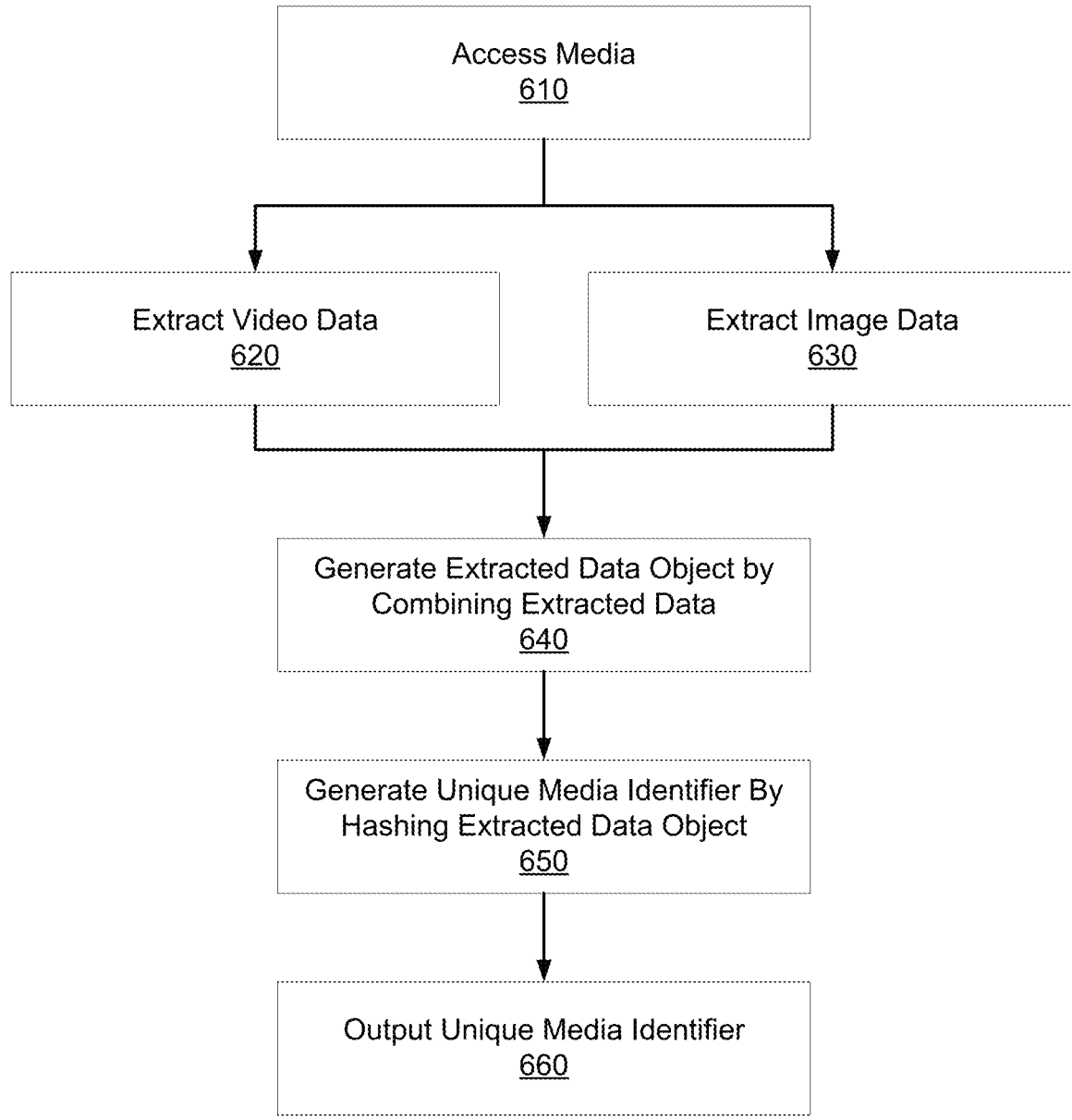
FIG. 6 is a flowchart illustrating generation of a unique identifier, according to one example embodiment.

FIG. 6 is a flowchart illustrating generation of a unique identifier, according to one embodiment. Different embodiments may include additional or fewer steps in different order than that described herein. In some embodiments, the identifier generator 376 on a client device (or media server 130) provides the functionality described herein.

The identifier generator 376 obtains media (e.g., a video or an image). For example, the media is obtained from local storage 340, or portions of the media are transferred via the network. The identifier generator 376 extracts 620 video data and/or extracts 630 image data from the media, as described in further detail with respect to FIGS. 7 and 8, respectively.

Turning to FIG. 7, it illustrates example data extracted 620 from a video to generate a unique media identifier for a video, according to one embodiment. In the example illustrated in FIG. 7, the video is an MP4 or LRV (low-resolution video) file. Extracted video data includes data related to time such as the creation time 701 of the media (e.g., beginning of capture, end of capture), duration 702 of the video, and timescale 703 (e.g., seconds, minutes) of the duration 702. For example, the identifier generator 376 accesses, from the video metadata, a duration value indicating a time duration of the video and a timescale value corresponding to a timescale of the duration value. The identifier generator 376 generates the extracted data object comprising the extracted video data combined with the duration value and the timescale value in an order specified by the identifier generation protocol.

Other extracted video data includes size data, such as total size, first frame size 704, size of a subsequent frame 705 (e.g., 300), size of the last frame 706, number of audio samples 707 in a particular audio track, and total number of audio samples, mdat atom size 708. (The mdat atom refers to the portion of an MP4 file that contains the video content.) To extract the size data (e.g., 704, 705, 706), the identifier generator 376 accesses a video frame having a frame number specified by the identifier generation protocol. The identifier generator 376 determines an amount of image data in the accessed video frame and combines the truncated image data with other extracted video data in an order specified by the identifier generation protocol. For example, the video identifier generator 376 accesses a video frame atom comprising all the video's video frames and one or more hierarchically nested headers to organize the video frame. The video identifier generator 376 determines a number of atom bits in the accessed video frame atom and generates the extracted data object by combining the determined number of atom bits with other data in an order specified by the identifier generation protocol.

Other extracted video data includes video content such as first frame data 709, particular frame (e.g., 300) data 710, last frame data 711, and audio data 712 from a particular track. To extract the video content (e.g., 709, 710, 711), the identifier generator 376 accesses a video frame having a frame number specified by the identifier generation protocol. For example, the identifier generation protocol species the first frame, last frame, and a frame at a particular index (e.g., the $42^{nd}$ frame). The identifier generator 376 may determine whether to access data from a frame at a particular index in response to determining that the number of video frames in the video exceeds the particular index. The identifier generator 376 may truncate image data in the access video frame to a predetermined number of bits specified by the identifier generation protocol. The identifier generator 376 combines the access (and optionally truncated) image data into the extracted video data in an order specified by the identifier generation protocol.

To extract audio content (e.g., 712), the identifier generator 376 accesses a channel of the audio or a portion of the audio (e.g., a time range) specified by the identifier generation protocol and combines the audio data from the specified channel and/or portion with other data in an order specified by the identifier generation protocol. The identifier generator 376 may optionally determine a number of audio samples (or audio data size such as number of bits) in the accessed video data and combine the determine number of audio samples (or audio data size) with other video data in an order specified by the identifier generation protocol. In some embodiments, the identifier generator 376 includes the number of audio samples (or audio size data) in the extracted video data in response to determining that the accessed audio includes a number of audio samples (or duration of audio) equaling or exceeding a threshold number of audio samples (or audio duration).

Other extracted video data includes user data, device data, or any other metadata associated with the video, which may be contained in udta atom data 713, for example. The udta atom refers to the portion of an MP4 file that contains user-specified or device-specified data. The identifier generator 376 may extract metadata associated with the video such as a video duration, video capture time, video capture date, video resolution, video frame rate, user identifier, or a user-specified caption. In some embodiments, the identifier generator 376 selects the metadata for inclusion by truncating the metadata (e.g., udta atom data 713) to less than a threshold size (e.g., 32 bytes). The identifier generator 376 combines extracted metadata with other video data in an order specified by the identifier generation protocol.

In some embodiments, the identifier 376 associates videos with another identifier such as an equipment identifier (e.g., camera identifier, sensor identifier, camera rig identifier, camera group identifier), a shot identifier, an occasion identifier, a parent media identifier. However, associating a video with another identifier does not modify the unique media identifier of the video. In other words, these other identifiers are not included in the extracted data object used to determine the unique media identifier. Similarly, associating a video with a highlight tag or chapter break marker does not modify the video's unique media identifier, and highlight tags and chapter breaks are not included in the extracted data object used to determine the unique media identifier.

Figure 8:
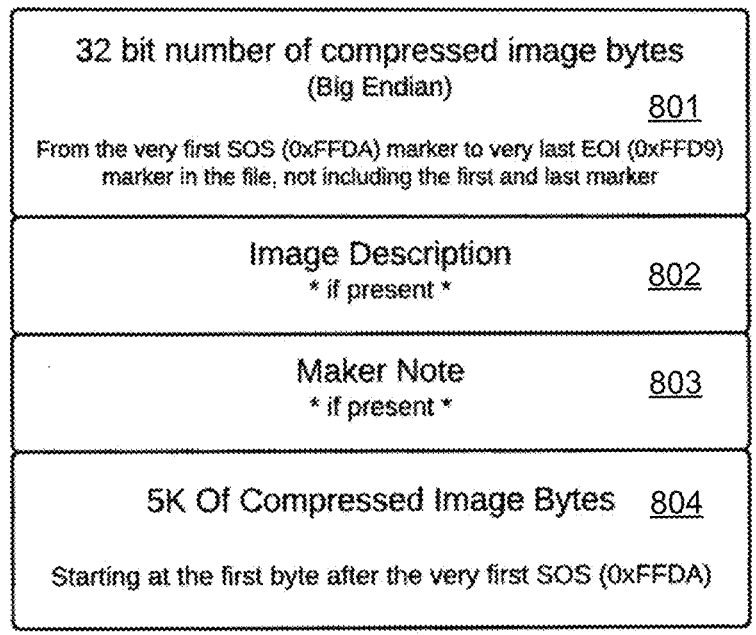
FIG. 8 illustrates data extracted from an image to generate a unique media identifier for an image, according to one example embodiment.

Turning to FIG. 8, it illustrates data extracted 630 (shown in FIG. 6) from an image to generate a unique media identifier for an image (e.g., a still image, a video frame), according to on embodiment. In the example illustrated in FIG. 8, the image is a JPEG file. Extracted image data includes image size data 801. For example, the image size data 801 is the number of bytes of image content between the start of scan (SOS, located at marker 0xFFDA in a JPEG file) and the end of image (EOI, located at marker 0xFFD9 in a JPEG file). The image size data may refer to the size of data in the original image or in a compressed version of an image. Extracted image data includes user-provided data such as an image description 802 or maker note 803. The user-provided data may be generated by a device (e.g., a file name). Extracted image data may include image content 804, which the identifier generator 376 may access and truncate according to a threshold amount of data (e.g., 5 kilobytes) specified by the identifier generator. The identifier generator 376 combined the image data, image metadata, or data derived therefrom in an order specified by the identifier generation protocol.

Data extracted 620, 630 from media may also include geographical location (e.g., of image capture), an indicator of file format type, an instance number (e.g., different transcodes of a media file have different instance numbers), a country code (e.g., of device manufacture, of media capture), and/or an organization code.

Turning back to FIG. 6, the identifier generator 376 generates an extracted data object comprising the extracted data arranged in an order specified by the identifier generation protocol. The data in the extracted data object is suitable for hashing, and may be converted to binary or any other suitable format for compatibility with the hash function. To generate 376 the unique media identifier, the identifier generator 376 hashes the extracted data object. For example, the hash function is the CityHash to output 128 bits, beneficially reducing chances of duplicate unique media identifiers among unrelated media items. However, any hash function outputting any number of bits may be used. As used herein, a "hash" or "hash function" refers to a deterministic algorithm that transforms input data into output data with the size of the output data (e.g., 256 bits, 128 bits, 64 bits) typically being less than the size of the input data. In some embodiments, the unique media identifier is the output of the hash function. In other embodiments, the output of the hash function is combined with a header (e.g., index bytes to indicate that the identifier's type is unique media identifier, a unique identifier of the user who captured or otherwise causes the media to be created).

The generated unique media identifier is output 660. The unique media identifier is stored as metadata in association with the input media. For example, the video is modified to include the media identifier by incorporating the media identifier into a header of the video. Alternatively or additionally, the video is modified to include the media identifier by encoding the unique media identifier as a watermark in the audio or video frames of the video. The device that generates the media identifier may communicate the identifier to other entities in the camera system environment to ensure consistent, efficient identification of the media. In some embodiments, an edited version of the media is associated with a new unique media identifier generated based on the edited version of the media.

The process described with respect to FIGS. 6 and 7 may be used to generate a unique media identifier for an audio file even if the audio does not accompany a video or still image. For example, the identifier generator omits extracting data describing video frames but does extract 620 data such as creation time 701, duration 702, timescale 703, number of audio samples 707, mdat atom size 708, audio content 712, udta atom data 713, or a combination thereof.

Similarly, the identifier generator 376 may generate a unique identifier for an image using the extracted data described with respect to FIG. 8, or with a subset of the extracted data described with respect to FIG. 7. The identifier generator 376 extracts 620 data as if the still image were a one frame video. For example, the extracted data does not include data related to an intermediate frame (e.g., 705, 710) and audio (e.g., 707, 712). Data related to the last frame (e.g., 706, 711) may be omitted, or the data extracted 620 from the first frame (i.e., the image) may be duplicated as data extracted 620 from the last frame.

In some embodiments, the media server 130 uses the generated unique media identifier to identify the media in a video viewing interface. For example, the media server sends previews of a video along with the video's unique media identifier to a client device. After a user selects the preview of the video through the video viewing interface, the client device requests the video using the unique media identifier. In response to receiving the request with the unique media identifier, the media server 130 retrieves the video (or a version thereof such as a low-definition version) from the video store 420 using the unique media identifier and transmits the video to the requesting client device.

As another example, a user edits a low-resolution version of a video through an editing interface presented by a client device while a higher-resolution version video is stored remotely from the client device. An edit decision list describing edits selected by the user with the client device are sent along with the unique media identifier of the video to the storage device storing the higher-resolution version (e.g., docking station 120, media server 130). The storage device retrieves the higher-resolution version of the video using the unique media identifier, and generates an edited version of the retrieved video according to the transmitted edit decision list. The edited version may be associated with the unique media identifier of the higher-resolution version, a new unique media identifier generated based on the edited version, or both.

Media Identifier Relationships

FIG. 9 illustrates a set of relationships between videos and video identifiers (such as the video identifiers created by the camera system or transcoding device), according to an embodiment. In a first embodiment, a video is associated with a first unique identifier. A portion of the video (for instance, a portion selected by the user) is associated with a second unique identifier, and is also associated with the first identifier. Similarly, a low-resolution version of the video is associated with a third identifier, and is also associated with the first identifier.

Video data from each of two different videos can be associated with the same event. For instance, each video can capture an event from a different angle. Each video can be associated with a different identifier, and both videos can be associated with the same event identifier. Likewise, a video portion from a first video and a video portion from a second video can be combined into the edited video sequence. The first video can be associated with an identifier, and the second video can be associated with a different identifier, and both videos can be associated with an identifier associated with the video sequence.

In some embodiments, multiple parent media correspond to a child media item. For example, two or more videos are consolidated to form a spherical, three-dimensional (3D), panoramic, or wide angle video. The initial videos (each captured from a separate camera or image sensor) may be associated with a unique media identifier. When consolidated into a spherical, 3D, or panoramic video (e.g., by stitching overlapping fields of view together), the resulting video has its own child media identifier. However, the consolidated video is also associated with parent media identifiers of the files used to generate the consolidated video.

In some embodiments, the identifier generator 376 generates a unique media identifier for a burst media file, which is a plurality of images captured within a short (e.g., one second) period of time. Each of the images may have a unique media identifier determined as described with respect to FIG. 8. To determine an overall unique media identifier for the burst media file, the identifier generator 376 assembles the images of the burst media file in chronological order and then generates the unique media identifier for the resulting video. As another example, the identifier generator 376 determines a unique identifier for a time lapse video (i.e., a series of images captured over an interval such as one, five, or minutes or hours) in a similar manner to generating the unique identifier for a burst video.

The identifier generator 376 may generate a unique media identifier for a chaptered video, which may include separate video files corresponding to each chapter. A unique media identifier is determined for each video corresponding to a chapter. The videos corresponding to chapters may be assembled into an overall video in an order specified by the video's editor, and the identifier generator 376 may generate another unique identifier for this overall video.

Additional Configuration Considerations

The disclosed embodiments beneficially facilitate management of video files. Generating identifiers indicating multiple characteristics of a video facilitates retrieving a set of videos having a same characteristic (and accordingly one matching identifier). The set of videos may then displayed to a user to facilitate editing or used to generate a consolidated video or edited video. A consolidated video (e.g., 3D, wide-angle, panoramic, spherical) comprises video data generated from multiple videos captured from different perspectives (often from different cameras of a camera rig). For example, when multiple cameras or camera rigs capture different perspectives on a shot, the shot identifier facilitates retrieval of videos corresponding to each perspective for use in editing a video. As another example, a camera rig identifier, combined with timestamp metadata, provides for matching of videos from the different cameras of the camera rig to facilitate creation of consolidated videos. The disclosed embodiments beneficially reduce processing time and increase efficiency of generating a unique media identifier by hashing an extracted subset of data from the video or image rather than hashing the entire video. Hashing the subset of data is orders of magnitude faster than hashing all the data in an image or video.

Certain embodiments are described herein as including logic or a number of components, modules, or mechanisms, for example, as illustrated in FIGS. 3 and 4. Modules may constitute software modules (e.g., code embodied on a machine-readable medium or in a transmission signal), hardware modules, or a combination thereof. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context. Further, unless expressly stated to the contrary, "or" refers to an inclusive or and not to an exclusive or.

Upon reading this disclosure, those of skill in the art will appreciate still additional alternative structural and functional designs for a system and a process for video identifier generation. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A system for generating unique identifiers, the system comprising:
   one or more physical processors configured by machine-readable instructions to:
      access a media item, the media item including an image, a video, or an audio;
      access an identifier generation protocol, the identifier generation protocol specifying data to be extracted from the media item and specifying an order in which to arrange the data extracted from the media item;
      extract first data and second data from the media item based on the data specified by the identifier generation protocol;
      arrange the first data and the second data in the order specified by the identifier generation protocol;
      generate a unique media identifier for the media item based on the arrangement of the first data and the second data; and
      store the unique media identifier.

2. The system of claim 1, wherein the first data includes information related to an image portion of the media item, an audio portion of the media item, a capture of the media item, or a user of the media item.

3. The system of claim 2, wherein the information related to the image portion of the media item includes a size, an image portion, or a resolution of one or more video frames in the media item.

4. The system of claim 3, wherein the one or more video frames include non-consecutive video frames.

5. The system of claim 2, wherein the information related to the audio portion of the media item includes a size or a number of audio samples in the media item.

6. The system of claim 2, wherein the identifier generation protocol specifies one or more audio channels of the media item from which the information related to the audio portion of the media item is extracted.

7. The system of claim 2, wherein the information related to the capture of the media item includes a duration of the media item, a timescale of the duration, a time of capture, a rate of capture, a format of capture, a location of capture, or a device identifier of a device that captured the media item.

8. The system of claim 2, wherein the information related to the user of the media item includes a user identifier or a user-specified description for the media item.

9. The system of claim 1, wherein the one or more physical processors are, to store the unique media identifier, further configured by the machine-readable instruction to modify the media item to include the unique media identifier.

10. The system of claim 8, wherein the unique media identifier is included in the media item as a watermark.

11. The system of claim 1, wherein the one or more physical processors are, to store the unique media identifier, further configured by the machine-readable instruction to generate metadata associated with the media item.

12. The system of claim 1, wherein the one or more physical processors are, to extract the first data and the second data from the media item, further configured by the machine-readable instruction to truncate one or both of the first data and the second data to a predetermined number of bits specified by the identifier generation protocol.

13. The system of claim 1, wherein the first data and second data are of same data type.

14. The system of claim 1, wherein the first data and second data are of different data types.

15. A method for generating unique identifiers, the method performed by a computing system including one or more physical processors, the method comprising:
    accessing, by the computing system, a media item, the media item including an image, a video, or an audio;
    accessing, by the computing system, an identifier generation protocol, the identifier generation protocol specifying data to be extracted from the media idem and specifying an order in which to arrange the data extracted from the media item;
    extracting, by the computing system, first data and second data from the media item based on the data specified by the identifier generation protocol;
    arranging, by the computing system, the first data and the second data in the order specified by the identifier generation protocol;
    generating, by the computing system, a unique media identifier for the media item based on the arrangement of the first data and the second data; and
    storing, by the computing system, the unique media identifier.

16. The method of claim 15, wherein the first data includes information related to an image portion of the media item, an audio portion of the media item, a capture of the media item, or a user of the media item.

17. The method of claim 15, wherein the identifier generation protocol specifies the first data and the second data to be extracted from the media item.

18. The method of claim 15, wherein extracting the first data and the second data from the media item includes truncating one or both of the first data and the second data to a predetermined number of bits specified by the identifier generation protocol.

19. The method of claim 15, wherein storing the unique media identifier includes modifying the media item to include the unique media identifier.

20. The method of claim 19, wherein the unique media identifier is included in the media item as a watermark.

\* \* \* \* \*